United States Patent
Mizutani et al.

(10) Patent No.: US 9,139,748 B2
(45) Date of Patent: Sep. 22, 2015

(54) PHOTOCURABLE INK COMPOSITION FOR INKJET PRINTING, AND PRINTED MATERIAL

(75) Inventors: Shinya Mizutani, Osaka (JP); Tatsuro Tsuchiya, Osaka (JP); Taichi Ono, Osaka (JP)

(73) Assignee: Sakata Inx Corp., Osaka (JP)

( * ) Notice: Subject to any disclaimer, the term of this patent is extended or adjusted under 35 U.S.C. 154(b) by 0 days.

(21) Appl. No.: 13/377,477

(22) PCT Filed: Jun. 14, 2010

(86) PCT No.: PCT/JP2010/060033
§ 371 (c)(1),
(2), (4) Date: Jul. 12, 2012

(87) PCT Pub. No.: WO2010/143738
PCT Pub. Date: Dec. 16, 2010

(65) Prior Publication Data
US 2012/0270018 A1    Oct. 25, 2012

(30) Foreign Application Priority Data
Jun. 12, 2009  (JP) ................................. 2009-141018

(51) Int. Cl.
*C09D 11/322* (2014.01)
*C09D 11/101* (2014.01)
*C09D 11/30* (2014.01)
*C09D 11/102* (2014.01)
*B41M 5/00* (2006.01)

(52) U.S. Cl.
CPC ............ *C09D 11/322* (2013.01); *C09D 11/101* (2013.01); *B41M 5/0023* (2013.01); *C09D 11/102* (2013.01); *C09D 11/30* (2013.01); *Y10T 428/24802* (2015.01)

(58) Field of Classification Search
CPC .. C09D 11/322; C09D 11/102; C09D 11/101; C09D 11/30; B41M 5/0023
USPC .......................... 522/167, 173, 178, 182, 909
See application file for complete search history.

(56) References Cited

U.S. PATENT DOCUMENTS

| | | | |
|---|---|---|---|
| 2008/0063981 A1* | 3/2008 | Ohnishi | 430/302 |
| 2009/0041991 A1* | 2/2009 | Takano et al. | 428/195.1 |
| 2009/0124720 A1 | 5/2009 | Tsuchiya et al. | |

FOREIGN PATENT DOCUMENTS

| | | |
|---|---|---|
| CN | 101029195 | 9/2007 |
| CN | 101426863 | 5/2009 |
| JP | 2006-169419 | 6/2006 |
| JP | 2007-056232 | 3/2007 |
| JP | 2009-035650 | 2/2009 |
| JP | 2009-120834 | 6/2009 |
| WO | 2007/097049 | 8/2007 |

* cited by examiner

*Primary Examiner* — Sanza McClendon
(74) *Attorney, Agent, or Firm* — Hamre, Schumann, Mueller & Larson, P.C.

(57) ABSTRACT

A photocurable ink composition for inkjet printing is obtained that has superior curability with respect to light from a light-emitting diode, has favorable adhesion to a polyvinyl chloride-based sheet, and is able to adequately inhibit the occurrence of cockling. The photocurable ink composition for inkjet printing at least has: a photopolymerizable compound; a photopolymerization initiator; and a sensitizer, wherein benzyl acrylate, N-vinylcaprolactam and an acrylated amine compound having two photopolymerizable functional groups and two amino groups in a molecule thereof are contained as the photopolymerizable compound, the content of the benzyl acrylate is 20 to 65% by mass in the photocurable ink composition for inkjet printing, a compound exhibiting an initiator function when irradiated with light having a wavelength of 450 to 300 nm is contained as the photopolymerization initiator, a compound exhibiting a sensitizer function when irradiated with light having a wavelength of 400 nm or longer is contained as the sensitizer, and a flash point as measured using a SETA closed-cup flash point tester according to a method in compliance with JIS K2265 is 70° C. or higher.

9 Claims, No Drawings

PHOTOCURABLE INK COMPOSITION FOR INKJET PRINTING, AND PRINTED MATERIAL

TECHNICAL FIELD

The present invention relates to a photocurable ink composition for inkjet printing and a printed article. More specifically, the present invention relates to a photocurable ink composition for inkjet printing having superior curability by curing with a light-emitting diode (LED), exhibits favorable adhesion to a polyvinyl chloride-based sheet such as a tarpaulin or vinyl chloride resin sheet, is able to adequately inhibit the occurrence of cockling, and is able to realize both safety and dischargeability from a discharge head by having a high flash point despite having low viscosity, and to a printed article.

BACKGROUND ART

The number of opportunities for the use of inkjet recording methods have recently increased in fields such as the production of large-sized, outdoor advertisements requiring a large image surface area.

Durable polyvinyl chloride-based sheets able to withstand outdoor use are used as base materials used in these applications in the manner of sheets composed of vinyl chloride resin per se as well as tarpaulin sheets made of composite materials. Photocurable ink compositions for inkjet printing that do not use volatile components have been proposed for use as inkjet printing ink used for printing on such polyvinyl chloride-based sheets.

However, ink compositions must be able to form a tough coating to enable the above-mentioned outdoor advertisements and the like to withstand wind and rain. However, ink compositions capable of forming a tough film with a photocurable material typically tend to have high coating hardness and decreased adhesion to the base material. Therefore, in order to improve the adhesion to a base material of such ink compositions, methods have been employed in which a component that dissolves the base material is contained in a portion of the ink. For example, an active energy beam-curable inkjet ink for use with polyvinyl chloride-based sheets has been proposed that contains an ethylenic double bond-containing compound that does not dissolve polyvinyl chloride and an ethylenic double bond-containing compound (N-vinylcaprolactam) that dissolves polyvinyl chloride at a specific ratio (see, for example, Patent Document 1).

However, in the case of producing a printed article using this type of inkjet ink, although adhesion to a polyvinyl chloride-based sheet is favorable, there is the problem of increased susceptibility to the occurrence of cockling (phenomenon in which the base material becomes wrinkled).

In addition, in the case of curing an image using a high-energy light source commonly used in the past such as a metal halide lamp, there are problems such as the generation of ozone, increased size of the radiation device and a short lamp life. Consequently, low-energy light-emitting diode lamps (LED lamps) have come to be used for the light source in recent years. Therefore, there is a need for correspondingly enhanced levels of curability and printing performance (such as improved adhesion and cockling).

Moreover, there has also recently been a strong desire for safer photocurable ink compositions for inkjet printing that correspond to Category 4 flammable liquids (liquids having a flash point of higher than 60° C. and equal to or lower than 93° C.) as defined in GHS (Globally Harmonized System of Classification and Labeling of Chemicals) based on concerns regarding safety and health.

In addition, there is also a demand for these photocurable inks for inkjet printing to be used in outdoor seal applications in addition to outdoor advertising, thereby requiring photocurable inks for inkjet printing to have stretchability of the cured film obtained by the curing thereof.

PRIOR ART DOCUMENTS

Patent Documents

Patent Document 1: Japanese Patent Application Laid-open No. 2006-169419

SUMMARY OF INVENTION

Problems to be Solved by the Invention

Therefore, an object of the present invention is to provide a photocurable ink composition for inkjet printing that has superior curability with respect to light from a light-emitting diode (LED), demonstrates favorable adhesion to a polyvinyl chloride-based sheet such as a tarpaulin or vinyl chloride resin sheet, and is able to adequately inhibit the occurrence of cockling, and to allow the obtaining of a cured film that realizes both favorable dischargeability and safety at normal temperatures by maintaining a high flash point while having low viscosity as well as demonstrates superior stretchability.

Means for Solving the Problems

In response to requirements for curability with respect to light from a light-emitting diode (LED), adhesion to polyvinyl chloride-based sheets and prevention of cockling, the inventors of the present invention proposed a photocurable ink composition for inkjet printing that contains as a photopolymerizable compound an acrylated amine compound having two photopolymerizable functional groups and two amino groups in a molecule thereof, and contains as a photopolymerization initiator a compound that demonstrates an initiator function when irradiated with light having a wavelength of 450 to 300 nm.

As a result this proposal, curability with respect to light from a light-emitting diode and printing performance were improved and made favorable.

However, inkjet ink that uses an acrylated amine compound having two photopolymerizable functional groups and two amino groups in a molecule thereof normally has high viscosity. On the other hand, since ink used for inkjet printing is required to have performance (dischargeability) that allows it to rapidly fill the discharge head and be discharged at as low a pressure as possible, it is difficult to obtain favorable dischargeability if viscosity remains high. Therefore, it is necessary to attempt to lower viscosity by combining the use of a photopolymerizable compound component so as to lower ink viscosity.

However, in the case of using a photopolymerizable compound component used for the purpose of lowering viscosity in the photocurable ink composition for inkjet printing previously proposed by the inventors of the present invention as previously described, the resulting ink is classified as a class 3 flammable liquid (having a flash point of 23° C. to 60° C.) as defined in GHS as a result of using the photopolymerizable compound component. Consequently, there was still room for improvement with respect to raising the flash point.

In addition, the photocurable ink composition for inkjet printing previously proposed by the inventors of the present invention also leaves room for improvement with respect to stretchability of the cured film following curing.

Therefore, as a result of conducting even more extensive studies to solve the above-mentioned problems, the inventors of the present invention found that by using benzyl acrylate as a photopolymerizable compound for the purpose of lowering viscosity, an ink composition can be realized that has relatively low viscosity while maintaining a flash point of 70° C. or higher and demonstrates favorable stretchability of the cured film following curing, thereby solving all of the above-mentioned problems and leading to completion of the present invention.

Namely, (1) the present invention relates to a photocurable ink composition for inkjet printing that at least contains: a photopolymerizable compound; a photopolymerization initiator; and a sensitizer, wherein benzyl acrylate, N-vinylcaprolactam and an acrylated amine compound having two photopolymerizable functional groups and two amino groups in a molecule thereof are contained as the photopolymerizable compound, the content of the benzyl acrylate is 20 to 65% by mass in the photocurable ink composition for inkjet printing, a compound exhibiting an initiator function when irradiated with light having a wavelength of 450 to 300 nm is contained as the photopolymerization initiator, a compound exhibiting a sensitizer function when irradiated with light having a wavelength of 400 nm or longer is contained for the sensitizer, and a flash point as measured using a SETA closed-cup flash point tester according to a method in compliance with JIS K2265 is 70° C. or higher.

In addition, (2) the present invention relates to the photocurable ink composition for inkjet printing described in (1) above, further containing 5 to 40% by mass of isobornyl acrylate and/or tetrahydrofurfuryl acrylate in the photocurable ink composition for inkjet printing.

In addition, (3) the present invention relates to the photocurable ink composition for inkjet printing described in (1) or (2) above, wherein a compound in which the two photopolymerizable functional groups are (meth)acryloyl groups and the amine value is 130 to 142 KOHmg/g is used as the acrylated amine compound.

In addition, (4) the present invention relates to the photocurable ink composition for inkjet printing described in (1), (2) or (3), further containing a pigment.

In addition, (5) the present invention relates to the photocurable ink composition for inkjet printing described in (1), (2), (3) or (4) above, wherein viscosity at a liquid temperature during inkjet printing is 20 mPa·s or less.

In addition, (6) the present invention relates to a photocurable ink composition for inkjet printing in which ductility of a cured film is 200% or more when the cured film is formed to have a thickness of 5 μm, width of 25 mm and length of 50 mm.

Furthermore, the ductility of a cured film as used in the present specification refers to a value measured according to the method described below.

A cured film having a thickness of 5 μm, width of 25 mm and length of 50 mm formed using the photocurable ink composition for inkjet printing is stretched in the lengthwise direction of the cured film until the surface of the cured film breaks under conditions of a load range of 0 to 10 kgf and a pulling speed of 30 mm/min using a tensile testing machine (Yasuda Seiki Seisakusho, Ltd.).

The value calculated according to the following formula is used as the value of ductility.

(Length of cured film until breakage of cured film surface/length before tensile test)×100(%)

In addition, the present invention relates to: (7) a printed article obtained by printing the photocurable ink composition for inkjet printing described in (1), (2), (3), (4), (5) or (6) above onto a polyvinyl chloride-based sheet at a film thickness of 1 to 20 μm followed by photocuring.

The following provides a detailed explanation of the photocurable ink composition for inkjet printing of the present invention and a printed article obtained by using the same.

The present invention is a photocurable ink composition for inkjet printing that at least contains a photopolymerizable compound, a photopolymerization initiator and a sensitizer.

Benzyl acrylate is used for the photopolymerizable compound that composes the photocurable ink composition for inkjet printing of the present invention. Although conventional photopolymerizable compounds used in photocurable ink compositions for inkjet printing generally have favorable curability with respect to light from a light-emitting diode in cases of having low viscosity, they also tend to have a low flash point. Consequently, there are many cases in which flash point simultaneously decreases when a low viscosity photopolymerizable compound is used to lower ink viscosity for the purpose of improving dischargeability. In contrast, benzyl acrylate does not cause a significant lowering of the flash point despite having low viscosity. In addition, combining the use of benzyl acrylate with an acrylated amine compound having two photopolymerizable functional groups and two amino groups in a molecule thereof makes it possible to favorably maintain curability with respect to light-emitting diode light.

In addition, benzyl acrylate also has the characteristic of improving stretchability of cured films. In consideration of these characteristics, the present invention attempts to lower viscosity while maintaining the flash point by not causing a significant decrease thereof by combining the use of benzyl acrylate with an acrylated amine compound having two photopolymerizable functional groups and two amino groups in a molecule thereof along with another photopolymerizable compound to be subsequently described. In addition, the present invention allows the obtaining of an ink composition having superior curability with respect to light-emitting diode light, superior adhesion and prevention of cockling, as well as superior stretchability of the resulting cured film.

In the present invention, the content of the above-mentioned benzyl acrylate is a total of 20 to 65% by mass and preferably 30 to 60% by mass in the photocurable ink composition for inkjet printing. If the content thereof is less than 20% by mass, the effect of lowering ink viscosity while maintaining a high flash point and curability with respect to light-emitting diode light and stretchability of the cured film are unable to be adequately obtained. If the content exceeds 65% by mass, the flash point ends up lowering.

In addition, an acrylated amine compound (acrylated amine synergist) having two photopolymerizable functional groups and two amino groups in a molecule thereof is further used as a photopolymerizable compound that composes the photocurable ink composition for inkjet printing of the present invention to improve adhesion to a polyvinyl chloride-based sheet and improve cockling. The use of this acrylated amine compound makes it possible to inhibit cockling while simultaneously allowing the obtaining of a high degree of adhesion to a polyvinyl chloride-based sheet.

Furthermore, examples of the above-mentioned photopolymerizable functional groups include functional groups polymerizable by visible light or non-visible light, including ultraviolet light and ionizing radiation such as an electron beam, to form crosslinked bonds between molecules. Examples of such photopolymerizable functional groups include photopolymerizable functional groups in the narrow sense that undergo a photopolymerization reaction as a result of being activated directly by irradiation with light, as well as photopolymerizable functional groups in the broad sense in which the polymerization reaction is initiated and accelerated by the action of an active species generated from a photopolymerization initiator when the photopolymerizable functional group is irradiated with light in the presence of a photopolymerization initiator.

Examples of the above-mentioned photopolymerizable functional groups include those having a photo-radical polymerization reactivity such as ethylenic double bonds, and those having photo cationic polymerization and photo anionic polymerization reactivity such as epoxy groups and other cyclic ether groups. In particular, photopolymerizable functional groups having an ethylenic double bond such as (meth)acryloyl groups, vinyl groups or allyl groups are preferable, and (meth)acryloyl groups are more preferable.

Furthermore, in the present specification, a (meth)acryloyl groups refers to an acryloyl group or a methacryloyl group.

The above-mentioned acrylated amine compound is preferably such that the above-mentioned two photopolymerizable functional groups are both (meth)acryloyl groups and the amine value is 130 to 142 KOHmg/g. As a result, adhesion to a polyvinyl chloride-based sheet and cockling can be made to be favorable.

Furthermore, in the present specification, the above-mentioned amine value refers to the amine value of 1 g of solid, and is determined by using a 0.1N aqueous hydrochloric acid solution measuring by potentiometric titration (using, for example, Comtite (Auto Titrator COM-900, Buret B-900 and TitStation K-900) manufactured by Hiranuma Sangyo Corp.), and converting to the potassium hydroxide equivalent.

In consideration of the effects of the present invention, the above-mentioned acrylated amine compound is preferably a compound obtained by reacting a bifunctional (meth)acrylate and an amine compound.

Examples of the above-mentioned bifunctional (meth) acrylate include alkylene glycol di(meth)acrylates such as 1,4-butanediol di(meth)acrylate, 1,6-hexanediol di(meth) acrylate, 1,9-nonanediol di(meth)acrylate, propylene glycol di(meth)acrylate, 1,3-butylene glycol di(meth)acrylate or neopentyl glycol di(meth)acrylate, di(meth)acrylates of bisphenol alkylene oxide addition products such as di(meth) acrylates of ethylene oxide addition products of bisphenol A, di(meth)acrylates of ethylene oxide addition products of bisphenol F, di(meth)acrylates of ethylene oxide addition products of bisphenol S, di(meth)acrylates of ethylene oxide addition products of thiobisphenol or di(meth)acrylates of ethylene oxide addition products of brominated bisphenol A, polyakylene glycol di(meth)acrylates such as polyethylene glycol di(meth)acrylates and polypropylene glycol di(meth) acrylates, and di(meth)acrylates of hydroxypivalic acid neopentyl glycol esters. In particular, 1,6-hexanediol di(meth) acrylate is preferable.

Furthermore, in the present specification, (meth)acrylate refers to acrylate or methacrylate.

Examples of the above-mentioned amine compound include monofunctional amine compounds such as benzylamine, phenethylamine, ethylamine, n-propylamine, isopropylamine, n-butylamine, isobutylamine, n-pentylamine, isopentylamine, n-hexylamine, cyclohexylamine, n-heptylamine, n-octylamine, 2-ethylhexylamine, n-nonylamine, n-decylamine, n-dodecylamine, n-tetradecylamine, n-hexadecylamine or n-octadecylamine, and polyfunctional amine compounds such as diethylenetriamine, triethylenetetramine, tetraethylenepentamine, 1,6-hexamethylenediamine, 1,8-octamethylenediamine, 1,12-dodecamethylenediamine, o-phenylenediamine, p-phenylenediamine, m-phenylenediamine, o-xylylenediamine, p-xylylenediamine, m-xylylenediamine, menthanediamine, bis(4-amino-3-methylcyclohexyl)methane, isophoronediamine, 1,3-diaminocyclohexane or spiroacetal-based diamines. In addition, other examples of polyfunctional amine compounds include high molecular weight types such as polyethyleneimine, polyvinylamine or polyallylamine.

A compound obtained by reacting 1,6-hexane di(meth) acrylate with an amine compound is preferably used for the above-mentioned acrylated amine compound. Specific examples thereof include CN371 (Sartomer Co., Inc.) and EB-7100 (Ebecryl 7100, Daicel-Cytec Co., Ltd.).

In the present invention, the content of the above-mentioned acrylated amine compound is preferably 5 to 20% by mass in the photocurable ink composition for inkjet printing. If the content is less than 5% by mass, adhesion to a polyvinyl chloride-based sheet decreases and cockling occurs easily. On the other hand, if the content exceeds 20% by mass, the problem may occur of ink viscosity being excessively high.

In addition, N-vinylcaprolactam is used as a photopolymerizable compound that composes the photocurable ink composition for inkjet printing of the present invention in order to improve adhesion to a polyvinyl chloride-based sheet.

In the present invention, the content of the above-mentioned N-vinylcaprolactam is preferably 1 to 30% by mass and more preferably 10 to 20% by mass in the photocurable ink composition for inkjet printing. If the content is less than 1% by mass, adhesion to a polyvinyl chloride-based sheet may decrease. On the other hand, if the content exceeds 30% by mass, the problem may occur of ink viscosity becoming excessively high.

In addition, since benzyl acrylate is used in the present invention, viscosity tends to be excessively low resulting in the occurrence of tackiness. Consequently, isobornyl acrylate and/or tetrahydrofurfuryl acrylate are preferably contained in the photocurable ink composition for inkjet printing at 5 to 40% by mass. If the content thereof is less than 5% by mass, decreases in viscosity and the occurrence of tackiness cannot be adequately inhibited, while if the content exceeds 40% by mass, adhesion tends to decrease.

Moreover, other photopolymerizable compounds other than the specific monomers previously described can also be used as photopolymerizable compounds composing the photocurable ink composition for inkjet printing of the present invention in amounts that do not cause a decrease in performance of the present invention, and particularly lowering of the flash point. These other photopolymerizable compounds such as monomers, prepolymers or oligomers can be used without any particular limitations thereon provided they are compounds that contain an ethylenic double bond.

Specific examples of the above-mentioned other photopolymerizable compounds include ethylene glycol di(meth) acrylate, diethylene glycol di(meth)acrylate, polyethylene glycol di(meth)acrylate, 1,6-hexanediol di(meth)acrylate, ethoxylated 1,6-hexanediol di(meth)acrylate, neopentyl glycol di(meth)acrylate, ethoxylated neopentyl glycol di(meth) acrylate, propoxylated neopentyl glycol di(meth)acrylate, tripropylene glycol di(meth)acrylate, polypropylene glycol di(meth)acrylate, 1,4-butanediol di(meth)acrylate, 1,9-nonanediol di(meth)acrylate, tetraethylene glycol di(meth)acrylate, 2-n-butyl-2-ethyl-1,3-propanediol di(meth)acrylate, dimethylol tricyclodecane di(meth)acrylate, hydroxypivalic acid neopentyl glycol di(meth)acrylate, 1,3-butyleneglycol di(meth)acrylate, ethoxylated bisphenol A di(meth)acrylate, propoxylated bisphenol A di(meth)acrylate, cyclohexane dimethanol di(meth)acrylate, dimethylol dicyclopentane di(meth)acrylate, trimethylolpropane tri(meth)acrylate, ethoxylated trimethylolpropane tri(meth)acrylate, propoxylated trimethylolpropane tri(meth)acrylate, pentaerythritol tri(meth)acrylate, tetramethylolpropane tri(meth)acrylate, tetramethylolmethane tri(meth)acrylate, pentaerythritol tetra(meth)acrylate, ethylene oxide-modified pentaerythritol tetra(meth)acrylate, caprolactone-modified trimethylolpropane tri(meth)acrylate, ethoxylated isocyanuric acid tri(meth)acrylate, tri(2-hydroxyethylisocyanurate) tri(meth)acrylate, propoxylated glyceryl tri(meth)acrylate, tetramethylolmethane tetra(meth)acrylate, ditrimethylolpropane tetra(meth)acrylate, ethoxylated pentaerythritol tetra(meth)acrylate, dipentaerythritol hexa(meth)acrylate, neopentyl glycol oligo(meth)acrylate, 1,4-butanediol oligo(meth)acrylate, 1,6-hexanediol oligo (meth) acrylate, trimethylolpropane oligo (meth)acrylate, pentaerythritol oligo(meth)acrylate, urethane (meth)acrylate, epoxy (meth)acrylate, polyester (meth)acrylate, 2-phenoxyethyl (meth)acrylate, (meth)acryloyl morpholine, 2-hydroxyethyl (meth)acrylate, 2-hydroxypropyl (meth)acrylate, 4-hydroxybutyl (meth)acrylate, isobutyl (meth)acrylate, t-butyl (meth)acrylate, isooctyl (meth)acrylate, cyclohexyl (meth)acrylate, methoxy triethylene glycol (meth)acrylate, 3-methoxybutyl (meth)acrylate, ethoxyethoxyethyl (meth)acrylate, butoxyethyl (meth)acrylate, ethoxy diethylene glycol (meth) acrylate, methoxy dipropylene glycol (meth)acrylate, methylphenoxyethyl (meth)acrylate, dipropylene glycol (meth) acrylate, and ethylene oxide (EO) or propylene oxide (PO) modification products thereof. One type of these other photopolymerizable compounds may be used or two or more types may be used as necessary.

A photoinitiator (compound) that demonstrates an initiator function when irradiated with light having a wavelength of 450 to 300 nm is used for the photopolymerization initiator that composes the photocurable ink composition for inkjet printing of the present invention. Furthermore, "demonstrating an initiator function when irradiated with light having a wavelength of 450 to 300 nm" as described above refers to having the property of absorbing light over the entire wavelength range of 450 to 300 nm. The use of such a photopolymerization initiator makes it possible to further impart curability with respect to LED light to the photocurable ink composition for inkjet printing of the present invention.

Specific examples of the above-mentioned photopolymerization initiator include triazine-based initiators such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-pipenyl-4,6-bis(trichloromethyl)-s-triazine, 2,4-bis(trichloromethyl)-6-styryl-s-triazine, 2-(naphtho-1-yl)-4,6-bis(trichloromethyl)-s-triazine, 2-(4-methoxy-naphtho-1-yl)-4,6-bis(trichloromethyl)-s-triazine, 2,4-trichloromethyl-(piperonyl)-6-triazine, and 2,4-trichloromethyl(4'-methoxystyryl)-6-triazine (such as trade name: TAZ-204, Midori Kagaku Co., Ltd.), 2,4,6-trimethylbenzoyl-diphenylphosphine oxide (trade name: TPO, Lamberti), and bis(2,4,6-trimethylbenzoyl)-phenylphosphine oxide (trade name: IRGACURE 819, Ciba Specialty Chemicals). Any of these may be used alone or two or more of types thereof may be used in combination.

The content of the photopolymerization initiator is preferably within the range of 3 to 20% by mass and more preferably within the range of 3 to 13% by mass in the photocurable ink composition for inkjet printing. If the content of the photopolymerization initiator is less than 3% by mass, curability with respect to light-emitting diode (LED) light may become inadequate. On the other hand, if the content exceeds 20% by mass, improvement of effects is not observed and the amount added is in excess, thereby making this undesirable.

A sensitizer (compound) that demonstrates a sensitizer function as a result of being irradiated with light having a wavelength of 400 nm or longer is used for the sensitizer that composes the photocurable ink composition for inkjet printing of the present invention.

Furthermore, "demonstrating a sensitizer function as a result of being irradiated with light having a wavelength of 400 nm or longer" as described above refers to having the property of absorbing light at a wavelength range of 400 nm or longer. The use of such a sensitizer makes it possible to promote curability by LED light of the photocurable ink composition for inkjet printing of the present invention.

Examples of the above-mentioned sensitizer include anthracene derivatives such as 9,10-dibutoxyanthracene, 9,10-diethoxyanthracene, 9,10-dipropoxyanthracene or 9,10-bis(2-ethylhexyloxy)anthracene, and thioxanthone-based sensitizers such as 2,4-diethylthioxanthone, 2-isopropylthioxanthone or 4-isopropylthioxanthone. Typical examples of commercially available anthracene derivatives include DBA and DEA (Kawasaki Kasei Chemicals Ltd.), while examples of commercially available thioxanthone-based sensitizers include DETX and ITX (Lambson).

The content of the sensitizer is preferably within the range of 0.5 to 3% by mass in the photocurable ink composition for inkjet printing. If the content of the sensitizer is less than 0.5% by mass, curability with respect to light-emitting diode (LED) light may be inadequate. On the other hand, if the content exceeds 3% by mass, improvement of effects is not observed and the amount added is in excess, thereby making this undesirable.

A known photopolymerization initiator or sensitizer other than those described above can also be added to the above-mentioned photocurable ink composition for inkjet printing in addition to the above-mentioned photopolymerization initiator and sensitizer.

In addition, a colorant can also be contained in the photocurable ink composition for inkjet printing of the present invention as necessary. Although there are no particular limitations on the colorant provided it is conventionally used in photocurable ink compositions for inkjet printing, a pigment is preferably used that favorably disperses in the photocurable ink composition for ink jet printing and has superior light resistance. The above-mentioned pigment may be an organic pigment or inorganic pigment.

Specific examples of the organic pigments include dye lake pigments, azo pigments, benzimidazolone pigments, phthalocyanine pigments, quinacridone pigments, anthraquinone pigments, dioxazine pigments, indigo pigments, thioindigo pigments, perylene pigments, perynone pigments, diketopyrrolopyrrole pigments, isoindolinone pigments, nitro pigments, nitroso pigments, anthraquinone pigments, flavanthrone pigments, quinophthalone pigments, pyranthrone pigments and indanthrone pigments.

Examples of the inorganic pigments include carbon black, titanium oxide, red oxide, graphite, iron black, chromic oxide green and aluminum hydroxide.

The preferable content in the case of using a pigment is 1 to 20% by mass in the photocurable ink composition for inkjet printing. If the pigment content is below the above-mentioned range, the image quality of the resulting printed article tends to decrease. On the other hand, if the above-mentioned range is exceeded, the pigment tends to have a detrimental effect on viscosity properties of the photocurable ink composition for inkjet printing.

In the case of using a pigment in the photocurable ink composition for inkjet printing of the present invention, a pigment dispersant is preferably used to improve the dispersibility of the pigment and the storage stability of the ink composition.

Although there are no particular limitations on the pigment dispersant provided it is a conventionally used pigment dispersant, a polymeric dispersant in particular is used preferably. Examples of such pigment dispersants include carbodiimide dispersants, polyesteramine dispersants, aliphatic amine dispersants, modified polyacrylate dispersants, modified polyurethane dispersants, multi-chain polymeric nonionic dispersants and polymeric ion activators. These pigment dispersants can be used alone or two or more types can be used as a mixture.

The content of the above-mentioned pigment dispersant is normally 1 to 200 parts by mass and preferably 1 to 60 parts by mass based on 100 parts by mass of the total amount of pigment used. If the content of the pigment dispersant is less than 1 part by mass, the pigment dispersibility and storage stability of the ink composition may decrease. On the other hand, although the pigment dispersant may be contained at greater than 200 parts by mass, there may be no difference in the effect thereof.

In addition, a solvent can be contained in the photocurable ink composition for inkjet printing of the present invention as necessary. A solvent can be preferably used that has a boiling point of 150 to 220° C. at normal pressure (1013 hPa). Specific examples of solvents include ester organic solvents, ether organic solvents, ether ester organic solvents, ketone organic solvents, aromatic hydrocarbon solvents and nitrogen-containing organic solvents. However, from the viewpoints of curability of the ink composition, environmental factors, flash point and the like, the use of an organic solvent is preferably avoided whenever possible. More specifically, the content of the organic solvent in the photocurable ink composition for inkjet printing is preferably 5% by mass or less, more preferably 2% by mass or less and particularly preferably 0% by mass.

Moreover, various types of additives can be added to the photocurable ink composition for inkjet printing of the present invention as necessary in order to demonstrate various functions. Specific examples thereof include photostabilizers, surface treatment agents, surfactants, viscosity lowering agents, antioxidants, anti-aging agents, crosslinking promoters, polymerization inhibitors, plasticizers, antiseptics, pH adjusters, anti-foaming agents and moisturizing agents.

The photocurable ink composition for inkjet printing of the present invention obtained from the above-mentioned constituent materials has a flash point of 70° C. or higher as measured using a SETA closed-cup flash point tester according to a method in compliance with JIS K2265. As a result of having such a flash point, the photocurable ink composition for inkjet printing of the present invention corresponds to Category 4 for flammable liquids under the GHS, and has superior safety with respect to low flammability.

From the viewpoints of obtaining favorable discharge performance, a thick printed film and the like, the viscosity of the photocurable ink composition for inkjet printing of the present invention at the liquid temperature during inkjet printing is preferably 20 mPa·s or less, more preferably 5 to 10 mPa·s, and particularly preferably 5 to 8 mPa·s.

In the present specification, the liquid temperature during inkjet printing as described above refers to the temperature of the ink composition under the following conditions. Namely, in the case of inkjet printing using the photocurable ink composition for inkjet printing of the present invention at room temperature (25° C.), the above-mentioned liquid temperature during printing is room temperature. On the other hand, in the case of printing a temperature higher than room temperature by heating an ink tank of an inkjet printing device, the above-mentioned temperature during printing is the temperature of the ink tank that is heated at the time of actual printing.

Furthermore, although the above-mentioned liquid temperature during printing is frequently room temperature, it is preferably lower than 60° C.

Viscosity at the liquid temperature during inkjet printing as described above refers to the viscosity measured using an E-type viscometer (trade name: RE100L viscometer, Toki Sangyo Co., Ltd.).

The photocurable ink composition for inkjet printing of the present invention is superior in terms of all aspects of curability with respect to light-emitting diode (LED) light, adhesion to a polyvinyl chloride-based sheet, prevention of cockling, dischargeability in terms of low viscosity, and safety such as low flammability. These effects are obtained as a result of containing the above-mentioned specific photopolymerizable compound, photopolymerization initiator and sensitizer.

There are no particular limitations on the method used to prepare the photocurable ink composition for inkjet printing of the present invention, and can be prepared by adding all of the above-mentioned materials and mixing with a bead mill or three-roll mill and the like. Furthermore, in the case of using a pigment, the photocurable ink composition for inkjet printing can also be prepared by first mixing the pigment, pigment dispersant and photopolymerizable compound to form a concentrated base, and then adding components such as the photopolymerizable compound, photopolymerization initiator and sensitizer thereto so as to achieve a desired composition.

<Printed Article Obtained from Photocurable Ink Composition for Inkjet Printing>

Although a polyvinyl chloride-based sheet such as a tarpaulin sheet or vinyl chloride resin sheet is preferable for the base material on which is printed the photocurable ink composition for inkjet printing of the present invention, base materials on which ink compositions for ultraviolet inkjet printing have conventionally been printed (such as paper, plastic film, capsules, gel, metal foil, glass, wood or cloth) can also be printed without any problems.

Next, a specific method of printing and curing the above-mentioned photocurable ink composition for inkjet printing consists of discharging the photocurable ink composition for inkjet printing onto a base material, followed by curing the photocurable ink composition for inkjet printing that has been impacted onto the base material by exposing to light.

For example, discharge onto the base material (printing of an image) can be carried out by supplying the photocurable ink composition for inkjet printing to a printer head of an inkjet recording printer, and discharging the ink composition from the printer head onto a recorded material so that the film thickness of the coated film is 1 to 20 μm, Exposure to light and curing (curing of the image) can be carried out by radiating light onto the ink composition coated onto the recorded material as an image.

A conventionally used inkjet recording printer can be used for the inkjet recording printer used to print the photocurable ink composition for inkjet printing. Furthermore, in the case of using a continuous type of inkjet recording printer, electrical conductivity is regulated by further adding an electrical conductivity-imparting agent to the photocurable ink composition for inkjet printing.

Examples of the light source used for image curing include sources of ultraviolet light, an electron beam, visible light and a light-emitting diode (LED). The photocurable ink composition for inkjet printing of the present invention allows the obtaining of superior curability even in the case of using an LED for the light source. In addition, the use of an LED enables images to be cured at a low energy level without generating ozone. Light from an LED is preferably an active energy beam having a peak wavelength within the range of 365 to 420 nm. A printed article obtained in this manner is also one aspect of the present invention.

Namely, the present invention is also a printed article obtained by printing the above-mentioned photocurable ink composition for inkjet printing onto a polyvinyl chloride-based sheet at a film thickness of 1 μm to 20 μm followed by photocuring the photocurable ink composition for inkjet printing.

Effect of the Invention

As a result of being composed in the manner described above, the photocurable ink composition for inkjet printing of the present invention has superior curability with respect to light-emitting diode (LED) light, has superior adhesion to a polyvinyl chloride-based sheet such as a tarpaulin sheet or vinyl chloride resin sheet, is able to adequately inhibit the occurrence of cockling, and demonstrates superior dischargeability at normal temperatures and safety. Consequently, the ink composition of the present invention is able to contribute to improved safety of photocuring inkjet printing and the reduced size of printing devices.

MODE FOR CARRYING OUT THE INVENTION

Although the following provides a more detailed explanation of the present invention through embodiments thereof, the present invention is not limited to these embodiments. Furthermore, the term "%" refers to "% by mass" and the term "parts" refers to "parts by mass" unless specifically indicated otherwise. The materials used in the following examples and comparative examples are as indicated below.
<Pigment Dispersant>
Ajisper (registered trademark) PB821 (Ajinomoto Co., Inc.)
<Photopolymerizable Compounds>
CN371: Reactive amine coinitiator (Sartomer, amine value: 137, contains two amino groups and two acryloyl groups)
CN373: Reactive amine coinitiator (Sartomer, amine value: 235, contains one amino group and two acryloyl groups)
V#160: Benzyl acrylate (Osaka Organic Chemical Industry Co., Ltd.)
V-CAP: N-vinylcaprolactam (ISP Japan Ltd.)
IBOX: Isobornyl acrylate
SR-285R: Tetrahydrofurfuryl acrylate (Sartomer)

<Photopolymerization Initiators>
TPO: 2,4,6-trimethylbenzoyl diphenyl phosphine oxide (Lamberti)
IRGACURE 819: Bis(2,4,6-trimethylbenzoyl)-phenyl phosphine oxide (Ciba Specialty Chemicals)
IRGACURE 907: (wavelength at which initiator function demonstrated: 260 to 340 nm, 240 nm or shorter, Ciba Specialty Chemicals)
<Sensitizer>
DETX: 2,4-diethylthioxanthone
<Additive>
BYK-315 (silicone additive, BYK Chemie)

EXAMPLES 1 to 10 AND COMPARATIVE EXAMPLES 1 to 8

<Preparation of Photocurable Ink Composition for Inkjet Printing>
<Black>
A mixture of pigment (Pigment Black 7), pigment dispersant (Solsperse 24000, Lubrizol Inc.), pigment derivative (Solsperse 5000, Lubrizol Inc.) and a photopolymerizable compound (isobornyl acrylate) blended to a blending ratio (mass ratio) of 20/8/1/71 was dispersed using an Eiger mill (using zirconia beads having a diameter of 0.5 mm as media) to obtain a concentrated base. Each component was blended using the resulting concentrated base according to the compositions (% by mass) shown in Table 1 to obtain the photocurable ink compositions for inkjet printing of Examples 1 to 7 and Comparative Examples 1 to 8.
<Yellow>
A mixture of pigment (Pigment Yellow 150), pigment dispersant (Solsperse 24000, Lubrizol Inc.), and a photopolymerizable compound (1,6-hexanediol diacrylate) blended to a blending ratio (mass ratio) of 16/6.4/77.6 was dispersed using an Eiger mill (using zirconia beads having a diameter of 0.5 mm as media) to obtain a concentrated base. Each component was blended using the resulting concentrated base according to the composition (% by mass) shown in Table 1 to obtain the photocurable ink composition for inkjet printing of Example 8.
<Cyan>
A mixture of pigment (Pigment Blue 15:4), pigment dispersant (Solsperse 24000, Lubrizol Inc.), and a photopolymerizable compound (isobornyl acrylate) blended to a blending ratio (mass ratio) of 20/8/72 was dispersed using an Eiger mill (using zirconia beads having a diameter of 0.5 mm as media) to obtain a concentrated base. Each component was blended using the resulting concentrated base according to the composition (% by mass) shown in Table 1 to obtain the photocurable ink composition for inkjet printing of Example 9.
<Magenta>
A mixture of pigment (Pigment Red 122), pigment dispersant (Solsperse 24000, Lubrizol Inc.), and a photopolymerizable compound (isobornyl acrylate) blended to a blending ratio (mass ratio) of 16/9.6/74.4 was dispersed using an Eiger mill (using zirconia beads having a diameter of 0.5 mm as media) to obtain a concentrated base. Each component was blended using the resulting concentrated base according to the composition (% by mass) shown in Table 1 to obtain the photocurable ink composition for inkjet printing of Example 10.
[Measurement of Viscosity of Photocurable Ink Compositions for Inkjet Printing]
Since the liquid temperature of the ink compositions during printing is 25° C. in the print test carried out in the present invention, viscosities of the photocurable ink compositions for inkjet printing obtained in Examples 1 to 10 and Comparative Examples 1 to 8 were measured under the condition of a temperature of 25° C. using an E-type viscometer (trade name: RE100L viscometer, Toki Sangyo Co., Ltd.). The results are shown in Table 2.

[Measurement of Flash Point of Photocurable Ink Compositions for Inkjet Printing]

The flash points of the photocurable ink compositions for inkjet printing obtained in Examples 1 to 10 and Comparative Examples 1 to 8 were measured while holding at a constant temperature with an aluminum block and using a SETA closed-cup flash point tester according to a method in compliance with JIS K2265. The results are shown in Table 2.

[Performance Evaluation of Photocurable Ink Compositions for Inkjet Printing]

The photocurable ink compositions for inkjet printing obtained in Examples 1 to 10 and Comparative Examples 1 to 8 were coated onto a polyvinyl chloride sheet (Flontlit Grossy 120 g, Cooley) using a #4 bar coater. Next, the coated ink compositions were cured using a Z-8 lamp manufactured by Heraeus (mercury lamp) or LED lamp manufactured by Phoseon Technology. The cured ink compositions were then evaluated for cure rate, LED cure rate, adhesiveness, solvent resistance and frictional resistance according to the methods described below. The results are shown in Table 2.

(Cure Rate)

Cure rate was evaluated as the number of passes until surface tackiness was no longer observed under irradiation conditions of 60 W×23 m/min and distance of 13 cm (cumulative amount of UV light: 30 mJ/cm$^2$) using a Z-8 lamp manufactured by Heraeus (mercury lamp).

(LED Cure Rate)

LED cure rate was evaluated as the number of passes until surface tackiness was no longer observed under irradiation conditions of 40 mJ/cm$^2$ per second using an LED lamp manufactured by Phoseon Technology.

(Adhesiveness)

Crosscuts were made in each coated film, and adhesiveness was evaluated according to the degree of ink peeling with cellophane tape based on the criteria indicated below.

◯: Peeling of ink not observed
x: Peeling of ink observed (Solvent Resistance)

The degree of peeling of the coated film was evaluated based on the following criteria when the coated film was rubbed 10 times at 500 g with a bleached cloth soaked with isopropyl alcohol (IPA) using a Gakushin-type rubbing tester (Daiei Kagaku Seiki Mfg. Co., Ltd.).

◯: Peeling of coated film not observed
Δ: Slight peeling of coated film observed
x: Peeling of coated film observed (Frictional Resistance)

The degree of peeling of the coated film was evaluated based on the following criteria when the coated film was rubbed 100 times at 500 g with a bleached cloth using a Gakushin-type rubbing tester (Daiei Kagaku Seiki Mfg. Co., Ltd.).

◯: Peeling of coated film not observed
Δ: Slight peeling of coated film observed x: Peeling of coated film observed (Prevention of Cockling)

The ink compositions were coated onto a polyvinyl chloride sheet (Flontlit Grossy 120 g, Cooley) using a #12 bar coater, and the presence of wrinkles (degree of shrinkage) on the back of a sheet obtained by irradiating with UV light was evaluated based on the criteria indicated below.

◯: Absence of shrinkage in coated portions to same degree as non-coated portions
x: Presence of shrinkage and bulging in coated portions in comparison with non-coated portions (Elongation Rate)

Elongation rate (ductility) was evaluated as the value calculated according to the following formula obtained by stretching in the lengthwise direction cured films having a thickness of 5 μm, width of 25 mm and length of 50 mm, formed using the photocurable ink compositions for inkjet printing obtained in Examples 1 to 10 and Comparative Examples 1 to 8, until the surface of the cured film breaks under conditions of a load range of 0 to 10 kgf and a pulling speed of 30 mm/min using a tensile testing machine (Yasuda Seiki Seisakusho, Ltd.).

(Length of cured film until breakage of cured film surface/length before tensile test)×100(%)

TABLE 1

| | Example | | | | | | | | | | Comparative Example | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 | 6 | 7 | 8 |
| Black Concentrated Base | 10 | 10 | 10 | 10 | 10 | 10 | 10 | | | | 10 | 10 | 10 | 10 | 10 | 10 | 10 | 10 |
| Yellow Concentrated Base | | | | | | | | 15 | | | | | | | | | | |
| Cyan Concentrated Base | | | | | | | | | 8 | | | | | | | | | |
| Magenta Concentrated Base | | | | | | | | | | 15 | | | | | | | | |
| CN371 | 6 | 6 | 6 | 6 | 15 | 6 | 6 | 6 | 6 | 6 | 6 | 6 | | | 6 | 6 | 6 | 6 |
| CN373 | | | | | | | | | | | | | 6 | | | | | |
| V-CAP | 15 | 15 | 15 | 15 | 15 | 10 | 20 | 15 | 15 | 15 | 7 | 15 | 15 | 15 | 15 | 15 | 15 | 15 |
| SR-285 | | | 35 | | | | | | | | | | | | | | | |
| V#160 | 50 | 50 | 25 | 60 | 41 | 55 | 45 | 40 | 43 | 52 | 70 | 15 | 50 | 50 | 50 | 50 | | |
| IBOX | 10 | 10 | | | 10 | 10 | 10 | 18 | 23 | 7.5 | | | 10 | 16 | 10 | 10 | 10 | 10 |
| 2-MTA | | | | | | | | | | | | 45 | | | | | | |
| DEAA | | | | | | | | | | | | | | | | | 50 | |
| SR-395 | | | | | | | | | | | | | | | | | | 50 |
| TPO | 6.5 | | 6.5 | 6.5 | 6.5 | 6.5 | 6.5 | 4 | 3 | 2 | 4.5 | 6.5 | 6.5 | 6.5 | | | 6.5 | 6.5 |
| IRGACURE819 | | 6.5 | | | | | | | | | | | | | | | | |
| DETX | 2 | 2 | 2 | 2 | 2 | 2 | 2 | 2 | 2 | 2 | 2 | 2 | 2 | 2 | | | 2 | 2 |
| 2,4,6-Trimethyl benzophenone | | | | | | | | | | | | | | | 8.5 | | | |

TABLE 1-continued

|  | Example | | | | | | | | | | Comparative Example | | | | | | | |
| --- | --- | --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 1 | 2 | 3 | 4 | 5 | 6 | 7 | 8 |
| IRGACURE907 |  |  |  |  |  |  |  |  |  |  |  |  |  |  |  | 8.5 |  |  |
| BYK315 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Total | 100 | 100 | 100 | 100 | 100 | 100 | 100 | 100 | 100 | 100 | 100 | 100 | 100 | 100 | 100 | 100 | 100 | 100 |

TABLE 2

|  | Example | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Viscosity (mPa·s, 25° C.) | 7.1 | 7.1 | 7.6 | 6.9 | 11.0 | 7.0 | 7.3 | 7.1 | 6.4 | 6.7 |
| Flash Point (° C.) | 70 or more | 70 or more | 70 or more | 70 or more | 70 or more | 70 or more | 70 or more | 70 or more | 70 or more | 70 or more |
| Z-8 Cure Rate | 1 time | 1 time | 1 time | 1 time | 1 time | 1 time | 1 time | 1 time | 1 time | 1 time |
| Elongation Rate (%) | 200 or more | 200 or more | 200 or more | 200 or more | 200 or more | 200 or more | 200 or more | 200 or more | 200 or more | 200 or more |
| Adhesiveness | ○ | ○ | ○ | ○ | ○ | ○ | ○ | ○ | ○ | ○ |
| Solvent Resistance | ○ | ○ | ○ | ○ | ○ | ○ | ○ | ○ | ○ | ○ |
| Frictional Resistance | ○ | ○ | ○ | ○ | ○ | ○ | ○ | ○ | ○ | ○ |
| Cockling | ○ | ○ | ○ | ○ | ○ | ○ | ○ | ○ | ○ | ○ |
| LED Cure Rate | 1 time | 1 time | 1 time | 1 time | 1 time | 1 time | 1 time | 1 time | 1 time | 1 time |
| Elongation Rate | 200 or more | 200 or more | 200 or more | 200 or more | 200 or more | 200 or more | 200 or more | 200 or more | 200 or more | 200 or more |
| Adhesiveness | ○ | ○ | ○ | ○ | ○ | ○ | ○ | ○ | ○ | ○ |
| Solvent Resistance | ○ | ○ | ○ | ○ | ○ | ○ | ○ | ○ | ○ | ○ |
| Frictional Resistance | ○ | ○ | ○ | ○ | ○ | ○ | ○ | ○ | ○ | Δ |
| Cockling | ○ | ○ | ○ | ○ | ○ | ○ | ○ | ○ | ○ | ○ |

|  | Comparative Example | | | | | | | |
| --- | --- | --- | --- | --- | --- | --- | --- | --- |
|  | 1 | 2 | 3 | 4 | 5 | 6 | 7 | 8 |
| Viscosity (mPa·s, 25° C.) | 5.0 | 5.5 | 12.0 | 3.0 | 7.1 | 7.1 | 8.0 | 9.2 |
| Flash Point (° C.) | 70 or more | 67 | 70 or more | 70 or more | 70 or more | 70 or more | 70 or more | 70 or more |
| Z-8 Cure Rate | 3 times | 1 time | 1 time | 10 times or more | 2 times | 2 times | 2 times | 2 times |
| Elongation Rate (%) | 200 or more | 200 or more | 200 or more | 200 or more | 200 or more | 200 or more | 200 or more | 200 or more |
| Adhesiveness | x | ○ | x | x | ○ | ○ | ○ | ○ |
| Solvent Resistance | ○ | ○ | ○ | ○ | ○ | ○ | ○ | ○ |
| Frictional Resistance | ○ | ○ | ○ | x | ○ | ○ | ○ | ○ |
| Cockling | ○ | ○ | ○ | x | ○ | ○ | ○ | ○ |
| LED Cure Rate | 3 times | 1 time | 1 time | 10 times or more | not cured | not cured | 7 times | 3 times |
| Elongation Rate | 200 or more | 200 or more | 200 or more | 200 or more | — | — | 200 or more | 200 or more |
| Adhesiveness | x | ○ | x | x | — | — | ○ | ○ |
| Solvent Resistance | ○ | ○ | ○ | ○ | — | — | ○ | ○ |
| Frictional Resistance | ○ | ○ | ○ | x | — | — | ○ | ○ |
| Cockling | ○ | ○ | ○ | x | — | — | ○ | ○ |

As is shown in Table 2, Examples 1 to 10 according to the present invention were determined to have a practical level of curability and demonstrate superior adhesion and prevention of cockling even in the case of using a low output lamp in the manner of a light-emitting diode (LED) despite having a flash point of 70° C. or higher in all cases. This is attributable to the configuration of the present invention that contains benzyl acrylate, N-vinylcaprolactam and an acrylated amine compound having two photopolymerizable functional groups and two amino groups in a molecule thereof as photopolymerizable compounds. The ink compositions for inkjet printing of Comparative Examples 1 to 8, which do not employ this configuration, had a flash point of lower than 70° C., did not have a practical level of curability, or did not demonstrate superior adhesion or prevention of cockling in the case of using a low output lamp in the manner of a light-emitting diode (LED). On the basis thereof, the photocurable ink composition for inkjet printing of the present invention was indicated to realize both practical curability and safety.

<Printing of Photocurable Ink Compositions for Inkjet Printing>

An inkjet recording printer provided with a piezo-type inkjet nozzle and the photocurable ink compositions for inkjet printing of the above-mentioned Examples 1 to 10 and Comparative Examples 1 to 8 were allowed to stand for 24 hours at an ambient temperature of 25° C. to bring the temperatures of the printer and the ink compositions to 25° C. Subsequently, printing was carried out continuously on a polyvinyl chloride sheet (Flontlit Grossy 120 g, Cooley) using the printer and ink compositions at an ambient temperature of 25° C. to obtain respective images thereof. The dischargeability of each of the above-mentioned photocurable ink compositions for inkjet printing was favorable, and images of a prescribed film thickness (10 μm) were obtained.

INDUSTRIAL APPLICABILITY

Despite the photocurable composition for inkjet printing of the present invention having a flash point of 70° C. or higher and being classified as a category 3 flammable liquid according to GHS, it demonstrates practical levels of curability, adhesion and cockling even in the case of using a low output lamp in the manner of an ultraviolet LED. On the basis thereof, the ink composition of the present invention can contribute to improvement of the safety of photocuring inkjet printing and to reduction of the size of printing devices.

The invention claimed is:

1. A photocurable ink composition for inkjet printing, comprising: a photopolymerizable compound; a photopolymerization initiator; and a sensitizer, wherein
the photopolymerizable compound comprises:
   benzyl acrylate in an amount from 40 to 60% by mass relative to the photocurable ink composition;
   N-vinylcaprolactam in an amount from 1 to 30% by mass relative to the photocurable ink composition;
   an acrylated amine compound having two photopolymerizable functional groups and two amino groups in a molecule thereof in an amount from 5 to 20% by mass relative to the photocurable ink composition; and
   at least one material selected from the group consisting of isobornyl acrylate and tetrahydrofurfuryl acrylate in an amount from 5 to 40% by mass relative to the photocurable ink composition,
wherein the photocurable ink composition does not include phenoxyethyl acrylate,
a compound exhibiting an initiator function when irradiated with light having a wavelength from 450 to 300 nm is contained as the photopolymerization initiator,
a compound exhibiting a sensitizer function when irradiated with light having a wavelength of 400 nm or longer is contained as the sensitizer, and
the flash point of the photocurable ink composition as measured using a SETA closed-cup flash point tester according to a method in compliance with JIS K2265 is 70° C. or higher.

2. The photocurable ink composition for inkjet printing according to claim 1,
wherein the acrylated amine compound having two photopolymerizable functional groups and two amino groups in a molecule thereof has (meth)acryloyl groups as the two photopolymerizable functional groups and has the amine value from 130 to 142 KOHmg/g.

3. The photocurable ink composition for inkjet printing according to claim 1, further comprising a pigment.

4. The photocurable ink composition for inkjet printing according to claim 1, wherein viscosity of the photocurable ink composition at an ink-jetting temperature is 20 mPa·s or less.

5. The photocurable ink composition for inkjet printing according to claim 1, wherein ductility of a cured film of the photocurable ink composition is 200% or more when the cured film has a thickness of 5 μm, a width of 25 mm, and a length of 50 mm.

6. A printed article obtained by printing the photocurable ink composition for inkjet printing according to claim 1, onto a polyvinyl chloride-based sheet at a film thickness of the photocurable ink composition from 1 to 20 μm, followed by photocuring.

7. The photocurable ink composition for inkjet printing according to claim 1,
wherein the photocurable ink composition further comprises at least one additional photopolymerizable material, in an amount that does not decrease performance of the photocurable ink composition, and
the at least one additional photopolymerizable material is selected from the group consisting of ethylene glycol di(meth)acrylate, diethylene glycol di(meth)acrylate, polyethylene glycol di(meth)acrylate, 1,6-hexanediol di(meth)acrylate, ethoxylated 1, 6-hexanediol di(meth)acrylate, neopentyl glycol di(meth)acrylate, ethoxylated neopentyl glycol di(meth)acrylate, propoxylated neopentyl glycol di(meth)acrylate, tripropylene glycol di(meth)acrylate, polypropylene glycol di(meth)acrylate, 1,4-butanediol di(meth)acrylate, 1,9-nonanediol di(meth)acrylate, tetraethylene glycol di(meth)acrylate, 2-n-butyl-2-ethyl-1,3-propanediol di(meth)acrylate, dimethylol tricyclodecane di(meth)acrylate, hydroxypivalic acid neopentyl glycol di(meth)acrylate, 1,3-butyleneglycol di(meth)acrylate, ethoxylated bisphenol A di(meth)acrylate, propoxylated bisphenol A di(meth)acrylate, cyclohexane dimethanol di(meth)acrylate, dimethylol dicyclopentane di(meth)acrylate, trimethylolpropane tri(meth)acrylate, ethoxylated trimethylolpropane tri(meth)acrylate, propoxylated trimethylolpropane tri(meth)acrylate, pentaerythritol tri(meth)acrylate, tetramethylolpropane tri(meth)acrylate, tetramethylolmethane tri(meth)acrylate, pentaerythritol tetra(meth)acrylate, ethylene oxide-modified pentaerythritol tetra(meth)acrylate, caprolactone-modified trimethylolpropane tri(meth)acrylate, ethoxylated isocyanuric acid tri(meth)acrylate, tri(2-hydroxyethylisocyanurate) tri(meth)acrylate, propoxylated glyceryl tri(meth)acrylate, tetramethylolmethane tetra(meth)acrylate, ditrimethylolpropane tetra(meth)acrylate, ethoxylated pentaerythritol tetra(meth)acrylate, dipentaerythritol hexa(meth)acrylate, neopentyl glycol oligo(meth)acrylate, 1,4-butanediol oligo(meth)acrylate, 1,6-hexanediol oligo(meth)acrylate, trimethylolpropane oligo(meth)acrylate, pentaerythritol oligo(meth)acrylate, urethane (meth)acrylate, epoxy (meth)acrylate, polyester (meth)acrylate, (meth)acryloyl morpholine, 2-hydroxyethyl (meth)acrylate, 2-hydroxypropyl (meth)acrylate, 4-hydroxybutyl (meth)acrylate, isobutyl (meth)acrylate, t-butyl (meth)acrylate, isooctyl (meth)acrylate, cyclohexyl (meth)acrylate, methoxy triethylene glycol (meth)acrylate, 3-methoxybutyl (meth)acrylate, ethoxyethoxyethyl (meth)acrylate, butoxyethyl (meth)acrylate, ethoxy diethylene glycol (meth)acrylate, methoxy dipropylene glycol (meth)acrylate, dipropylene glycol (meth)acrylate, modification products thereof with ethylene oxide or propylene oxide, and mixtures thereof.

8. The photocurable ink composition for inkjet printing according to claim 1,
wherein photopolymerizable materials in the photocurable ink composition consist of the benzyl acrylate, the N-vinylcaprolactam, the acrylated amine compound, and the at least one material selected from the group consisting of the isobornyl acrylate and the tetrahydrofurfuryl acrylate.

9. The photocurable ink composition for inkjet printing according to claim 7,
wherein photopolymerizable materials in the photocurable ink composition consist of the benzyl acrylate, the N-vinylcaprolactam, the acrylated amine compound, the at least one material selected from the group consisting of the isobornyl acrylate and the tetrahydrofurfuryl acrylate, and the at least one additional photopolymerizable material.

* * * * *